United States Patent
Larsen et al.

[11] Patent Number: 5,827,598
[45] Date of Patent: Oct. 27, 1998

[54] METHOD AND APPARATUS FOR SEALING AN AIRCRAFT PENETRATION

[75] Inventors: John T. Larsen, Arlington; John E. Huber, Edmonds, both of Wash.

[73] Assignee: The Boeing Company, Seattle, Wash.

[21] Appl. No.: 743,946

[22] Filed: Nov. 5, 1996

[51] Int. Cl.[6] .................................. B64C 1/40; E04B 1/74
[52] U.S. Cl. ........................... 428/131; 428/63; 428/66.4; 428/66.6; 428/137; 428/139; 428/41.8; 428/119; 428/907; 156/293; 244/131; 52/404.2; 29/423; 29/437; 411/338; 411/339; 411/512
[58] Field of Search ........................... 428/63, 66.4, 66.6, 428/131, 137, 139, 41.8, 119, 907; 156/293; 244/131; 52/404.2; 411/338, 339, 512; 29/423, 432

[56] References Cited

U.S. PATENT DOCUMENTS

| | | | |
|---|---|---|---|
| 3,238,835 | 3/1966 | Rosenberg | 411/338 |
| 3,829,150 | 8/1974 | Moore | 296/39 A |
| 4,074,501 | 2/1978 | Sandqvist | 52/741 |
| 4,235,398 | 11/1980 | Johnson | 244/119 |
| 4,442,647 | 4/1984 | Olsen | 52/393 |
| 4,959,251 | 9/1990 | Owens et al. | 428/41 |
| 5,330,811 | 7/1994 | Buchalter | 428/40 |
| 5,455,084 | 10/1995 | Spencer | 428/33 |
| 5,553,368 | 9/1996 | Barry | 29/423 |

FOREIGN PATENT DOCUMENTS

| | | | |
|---|---|---|---|
| 2685756 A1 | 7/1993 | France | . |

*Primary Examiner*—William P. Watkins, III
*Attorney, Agent, or Firm*—Christensen O'Connor Johnson & Kindness PLLC

[57] ABSTRACT

A penetration seal (12) is provided including a flexible patch (14) having adhesive (20) applied to one of the patch's first and second face surfaces (16), (18). An opening (22) is formed in the patch (14) of a size predetermined to fit a particular penetration (24). The opening (22) is slightly smaller than the cross-sectional shape of the penetration (24). In addition, a method of sealing the space (28) between an aircraft penetration (24) and surrounding insulation material (26) is provided. The method includes providing a seal (12) having a patch (14) with first and second face surfaces (16), (18), an opening (22) in the patch (14), and adhesive (20) applied to the first face surface (16). The method further includes applying the patch (14) to the penetration and insulation material by passing the penetration (24) through the opening (22) at the first face and pressing the first face surface (16) to the insulation material (26). In preferred embodiments, the method includes removing the seal (12) and the surrounding insulation material (26) as an assembly from the penetration and reapplying it at a later time.

17 Claims, 4 Drawing Sheets

5,827,598

METHOD AND APPARATUS FOR SEALING AN AIRCRAFT PENETRATION

FIELD OF THE INVENTION

The present invention relates to methods and apparatus for sealing adjacent surfaces, and more particularly, to methods and apparatus for sealing aircraft penetrations that protrude from various blanketed aircraft structures.

BACKGROUND OF THE INVENTION

Current commercial aircraft fuselages are built by interconnecting a number of structural members, such as longitudinal stringers and circular frames (labeled 10 in the attached FIGURES). A metal skin is attached to the outside of the stringers to form the fuselage exterior surface. Various system components (e.g., electrical wires, heating ducts, etc.) are then attached to the inboard surfaces of the structural members using system supports. The system supports generally consist of brackets, fittings, standoffs, and the like.

Insulation blankets are placed over the frames to insulate the fuselage interior from the low temperatures present at high altitudes. Often, the system supports have portions that must extend beyond the thickness of the insulation. To accommodate these portions, the insulation material is cut and fitted around the protruding portion. Because the system supports are said to "penetrate" the insulation layer, the supports are generally referred to as "penetrations". As used herein, the word "penetrations" is meant to indicate any component (system support or otherwise) that penetrates the insulation layer and thus requires an opening to be formed in the layer. Lastly, lightweight decorative panels are installed over the insulation and all protruding penetrations. The decorative panels form the interior walls of the cabin.

During flight, moist cabin air tends to migrate behind the decorative panels, through the openings in the insulation at the penetrations, and outward to the inside of the inboard surface of the skin. At high altitudes, the ambient temperature is well below freezing and thus makes the skin very cold. Once the moist air reaches the skin, the moisture condenses and freezes onto the skin.

When the aircraft reaches a lower altitude (and a commensurate higher skin temperature), this frost melts. The runoff accumulates on the outboard side of the insulation blankets. The intended location for this liquid runoff is to remain behind the insulation blankets where gravity will cause the liquid to migrate to exit drains that are located in the bottom of the fuselage. Due to the high number of provisions and the associated penetrations extending through the insulation blankets, however, the condensation run-off can sometimes find its way through to the cabin. The run-off may eventually drip onto passengers or cargo. (This dripping of liquid in the cabin is sometimes referred to as "rain in the plane".) The situation is exacerbated by the sheer number of penetrations in a typical aircraft, e.g., one thousand or more is not uncommon. This cycle of freezing and melting has occurred in aircraft for many years, going back at least to the start of pressurized, high-altitude aircraft flight.

Some aircraft designs use foam patches that are custom-shaped to fit around each penetration in order to cover the space between the penetration and the insulation blanket. The foam patches rely on their stiffness and a unique installation technique in order to cover the space. Although the foam patches are helpful in reducing the size of each opening, they are not designed to form a water-tight seal. In addition, they are difficult and time consuming to install.

Other aircraft use a paste or sealant material applied around each penetration joint opening. This method has the obvious drawbacks of being labor intensive and potentially heavy. In addition, it is important to be able to remove both the insulation material and seal during maintenance inspections. A sealant material cannot be removed and then reused, and as a result, fresh sealant must be applied.

Yet other aircraft seal off the space between the penetration and the insulation material by applying blanket tape around each penetration. Blanket tape, however, is not elastic, so penetrations having odd shapes are difficult and labor intensive to seal with blanket tape. Also, a blanket tape seal cannot be reused.

Therefore, a need exists for an improved method and apparatus for sealing the space between an aircraft penetration and surrounding insulation blanket material. The optimum seal should stop moist air from passing behind aircraft insulation and prevent fluid from passing back into the cabin. Further, the ideal seal should be lightweight, easy to install, durable, removable, flexible, able to accommodate odd shapes, and effective against transference of liquid and liquid vapor.

SUMMARY OF THE INVENTION

In accordance with the present invention, an aircraft penetration seal for sealing the open space between a penetration and surrounding insulation material is provided. The seal includes a patch having an opening through which the penetration may be inserted and an adhesive attached to one side of the patch. In preferred embodiments, the patch is formed from an elastic material, e.g., neoprene, silicone, elastomeric polyurethane, etc. The patch is preferably between about 0.005 inches to 0.100 inches thick. The adhesive is preferably formed from acrylic, silicone, or a synthetic rubber based water resistant pressure sensitive material.

In accordance with other aspects of this invention, the patch opening is of a size slightly smaller than the cross-sectional area of the penetration. During use, the edges of the opening form a lip surrounding the exterior surface of the penetration. Preferred opening shapes include a circle, a rectangle with rounded corners, and a pair of slots with rounded ends. Where a particular penetration has a concave cross-section (e.g., an L-shaped cross-section), a filler material is provided and inserted into the concave surface portion. The opening in the patch contacts the filler at the location of the concavity so as to form a tight seal. Fillers are formed from various materials including nomex felt treated with an antifungal solution.

In accordance with further aspects of this invention, a method of sealing a space between an aircraft penetration and surrounding insulation material is provided. The method includes providing a flexible patch having first and second face surfaces, an opening in the patch, and adhesive on the first face surface. The method further includes applying the patch to the penetration by passing the penetration through the opening at the first face and pressing the adhesive first face surface to the surrounding insulation material to seal the space.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
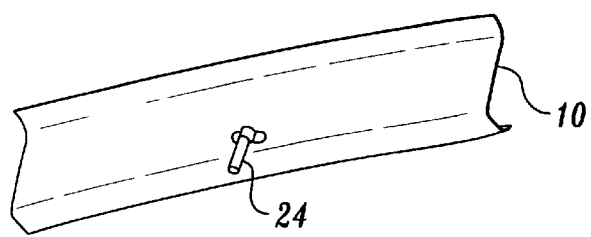
FIG. 1 is a perspective view of an example wiring support penetration to which the present invention may be applied.
Figure 2:
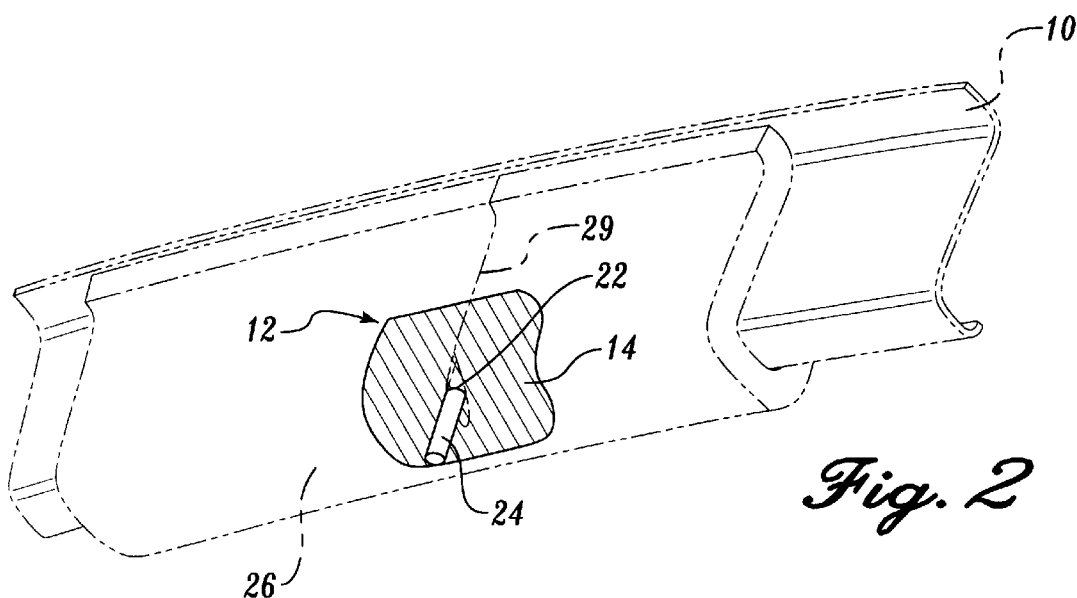
FIG. 2 is a perspective view of a first embodiment of a seal formed in accordance with the present invention for use with the example penetration of FIG. 1.

In general, a penetration seal 12 formed in accordance with the present invention includes a flexible patch 14 having first and second face surfaces 16, 18. An adhesive 20 is attached to the first face surface 16. An opening 22 is formed in the patch 14 of a size predetermined to fit a particular aircraft penetration 24. In use, the penetration 24 is inserted through the opening 22 and the adhesive surface 16 is pressed to insulation material 26 surrounding the penetration 24.

The penetration seal 12 of the present invention is particularly useful in sealing the space or joint 28 between the insulation material 26 and the penetration 24. The space 28 is the result of an opening 29 formed in the insulation material to accommodate the penetration. Example aircraft penetrations include electrical wiring, electrical ground blocks, tie rod fittings, etc. These penetrations penetrate the insulation material in a manner that forms a potential path for moisture and condensation.

In more detail, the patch 14 is formed from a material that is elastic, i.e., it may be stretched and yet return to a shape similar to its original shape. Example materials include elastomers in general, as well as flexible memory metal alloys. Elastomers that may be used with the present invention include neoprene, silicone, elastomeric polyurethane, etc. Preferred patch materials include aliphatic elastomeric polyurethane. It is important that the material also be durable. During production, workers must be able to quickly apply the seal 12. If the patch material is not durable, then the worker may inadvertently tear or puncture the seal on the penetration 24 during seal installation. In addition, more durable materials will resist tears and cracks during aircraft loading and vibrations and also during aircraft maintenance inspections. Lastly, the patch material should be moisture-resistant, and preferably moisture proof, so that moisture does not pass through the patch.

Figure 3:
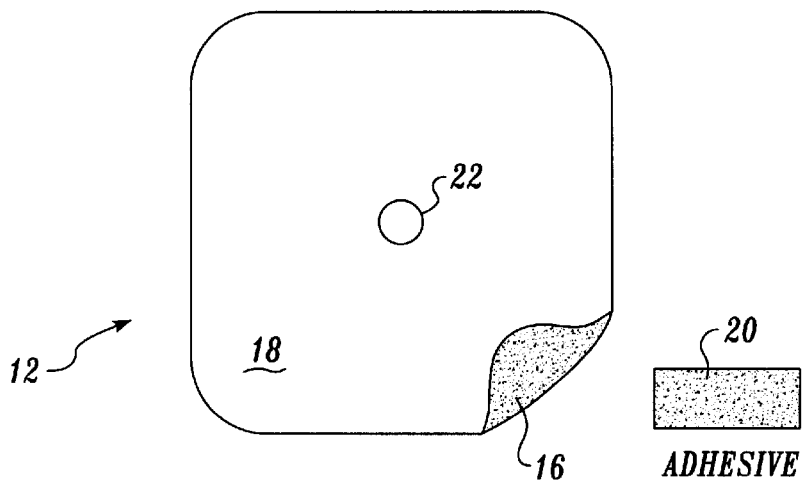
FIG. 3 is a plan view of the seal of FIG. 2.
Figure 6:
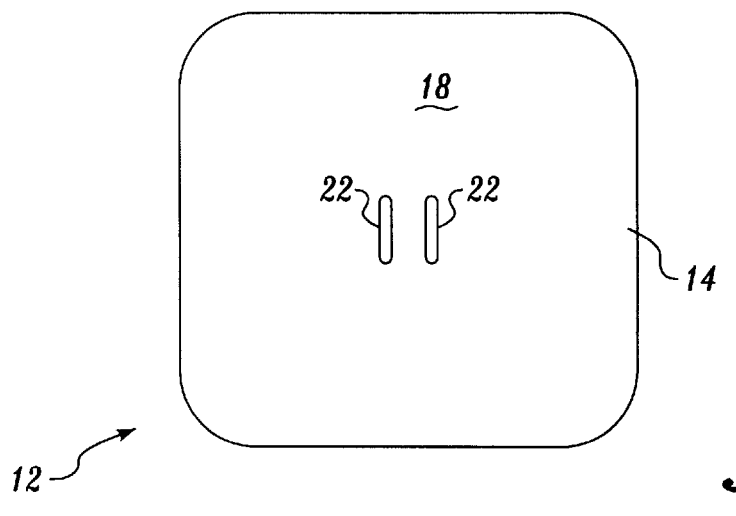
FIG. 6 is a plan view of the seal of FIG. 5.
Figure 9:
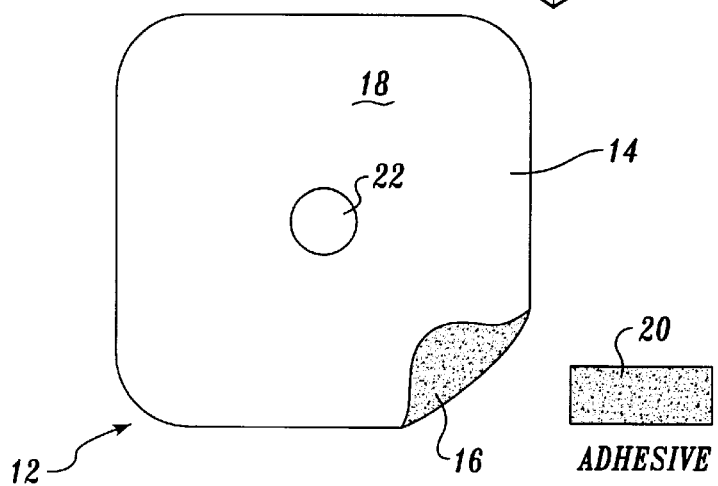
FIG. 9 is a plan view of the seal of FIG. 8.

Correspondingly, the patch thickness will depend on the patch material being used. For example, if a less durable patch material is being used, then the patch 14 should be correspondingly thicker. For example, silicone rubber material would preferably be sized at about 0.020 inches thick. Likewise, if the material is highly durable, then less thickness will be required. For example, a seal using elastomeric polyurethane patch material would preferably be sized at about 0.014 inches thick. In general, the patch thickness is between about 0.005 to 0.100 inches. Referring to FIGS. 3, 6, and 9, the platform size and shape of the seal 12 should be large enough that the opening 22 is relatively small by comparison. This provides a large sticking area to attach to the insulation material 26, making it unlikely that the seal 12 will split apart if subjected to large loads or vibrations and ensuring that all spaces between the insulation material 26 and the penetration 24 are sealed. The opening 22 is located roughly in the center of the seal planform.

The adhesive 20 is composed of a pressure-sensitive material that is initially removable, but when allowed to cure, is strongly adhesive. Therefore, the cured adhesive 20 keeps the patch 14 attached to the insulation material 26 at all times. During maintenance inspections, the insulation material 26 and seal 12 are pulled away as a single unit in order to reveal the structure and the penetration. After the combination of seal 12 and insulation material 26 are removed, they should be capable of being re-installed onto the penetration and structure, preferably multiple times, before showing signs of wear or tearing. The adhesives may be provided with a disposable release liner (not shown) that can be conveniently pulled away prior to installation of the patch.

The adhesives are preferably formed from flame retardant permanent acrylic. A preferred seal embodiment is formed from item number D-9215FR produced by the Patco Corp. at P.O. Box 1200, Bristol, R.I. 02809-0995. This is a transparent flame retardant aliphatic polyurethane material. Item number 814 (adhesive backed clear aromatic polyurethane material) of the same producer has also yielded good results.

Figure 10:
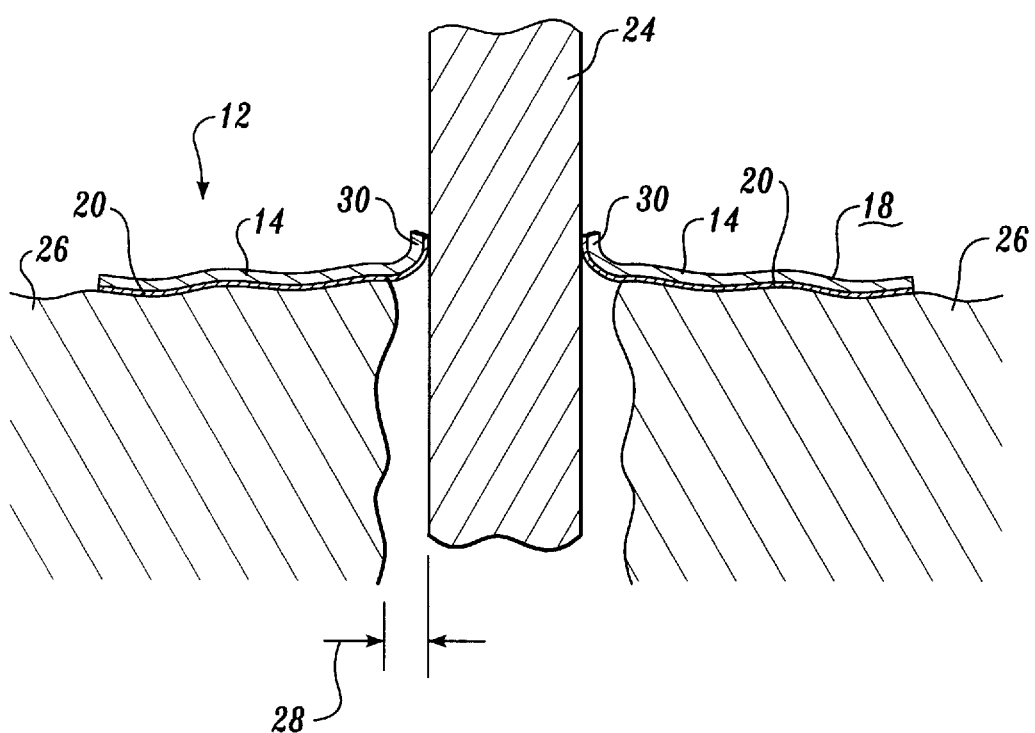
FIG. 10 is a cross-sectional detail view of the contact made between a penetration and a seal formed in accordance with the present invention.

Still referring to FIGS. 3, 6, and 9, the opening 22 is shaped similar to the shape being sealed, only slightly smaller in size. How much smaller is a function of the elasticity and durability of the materials being used. The ideal fit should allow the operator to install the seal 12 quickly and easily, and should form a slight outward lip 30 about the penetration 24 as shown in FIG. 10. This lip 30 is important in ensuring a good seal about the penetration 24. Therefore, the patch material must be able to withstand being formed into a lip 30 without tearing or separating from the penetration 24.

Figure 4:
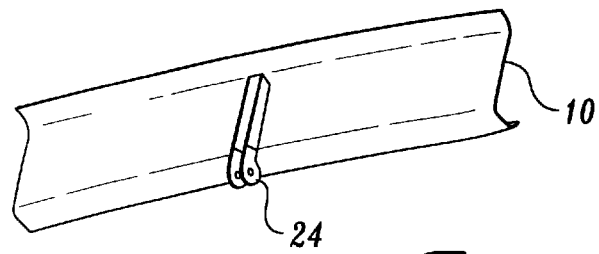
FIG. 4 is a perspective view of an example tie rod support fitting penetration to which the present invention may be applied.
Figure 5:
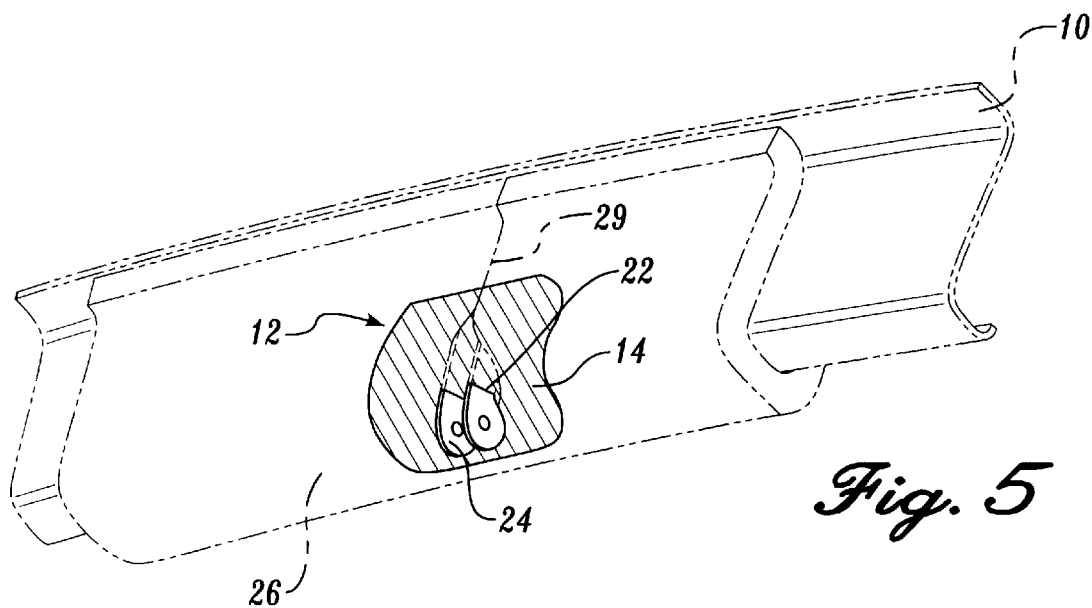
FIG. 5 is a perspective view of a second embodiment of a seal formed in accordance with the present invention for use with the example penetration of FIG. 4.

Referring to FIGS. 4–6, the size of opening 22 will also depend on the shape of the penetration 24. In general, the present invention seal 12 works best with penetrations that do not have significantly larger cross-sections at their unattached ends when compared to the cross-section at the intended seal location. It is difficult to get the seal 12 around an enlarged end portion, which increases the likelihood of ripping the opening 22. The tie rod fitting of FIGS. 4 and 5 is an example of an acceptable size difference between the circular head of the fitting flanges and their smaller sized necks.

The openings 22 may be any shape, though it is preferred to use only outwardly curved or straight shapes. Since the patch material will stretch, a single cutout size may be used to fit more than one cross-section size and shape of penetration, provided the proper tight seal is formed and provided the hole will stretch without degrading. Therefore, in FIG. 3, the opening is circular to fit a penetration having a circular cross-section. The same opening size may be used to fit a larger circular penetration cross-section so long as the opening does not tear or become overly stressed. In a similar manner, in FIG. 9, the opening is circular to fit a somewhat triangular combination of penetration and filler (described below). This attribute results in being able to produce only a few patch geometries to cover thousands of penetrations.

In FIG. 6 the opening is actually two openings, each being elongated rectangles or slots with rounded ends. Alternatively, the opening may be a slit, though, tear stop holes are recommended to be formed at each slit end. The diameter of the tear stop holes should be as small as possible while still preventing tearing of the seal during installation and/or removal.

As will be appreciated from viewing FIGS. 1–9, the cross-sectional shape of the penetrations at the location of the seal 12 preferably contains only convex shapes. By "convex" what is meant is that in drawing a line from any point about the exterior of the shape to any other point about the exterior of the shape, the line will fall entirely within the cross-sectional area of the penetration (including an exterior surface). By contrast, concave shapes are those shapes in which some portion of the line passes outside of the cross-sectional area.

Figure 7:
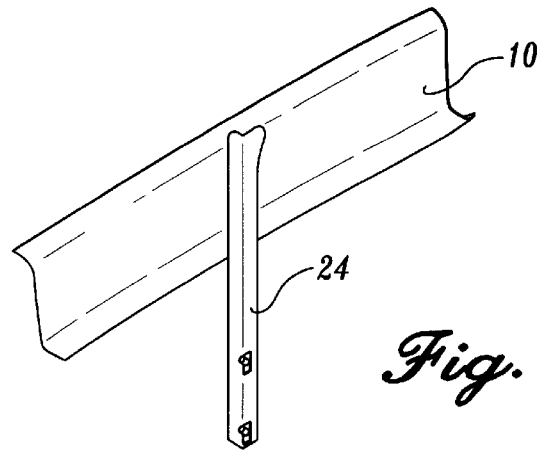
FIG. 7 is a perspective view of an example support bracket penetration to which the present invention may be applied.

Referring to FIG. 7, there shown in perspective view is an L-shaped bracket. The cross-sectional shape of the L is a concave shape since a line from end-to-end would pass outside of the cross-sectional area of the L. To compensate for the corner, a small filler 32 is positioned in the corner at the location along the penetration where the seal 12 will be positioned.

Selection as to the type of filler and the type of filler material will vary depending on the application. For example, the filler may be formed by bonding a substance directly to the penetration. Preferably, the filler is separable, though, to allow for easy repair. Example materials include Teflon, paper, fiber, plastic, felt, etc. A preferred filler material is lightweight nomex felt that has been treated with an antifungal solution. Such a felt is formed from thin paper that is rolled to form the appropriate filler thickness. A preferred filler material of this type is item number B3652-93F produced by Albany International Research at 777 West Street, P.O. Box 9114, Mansfield, Mass. 02048-9114. This particular paper is 0.09 inches thick and is rolled into a filler of 1 inch diameter.

Figure 8:
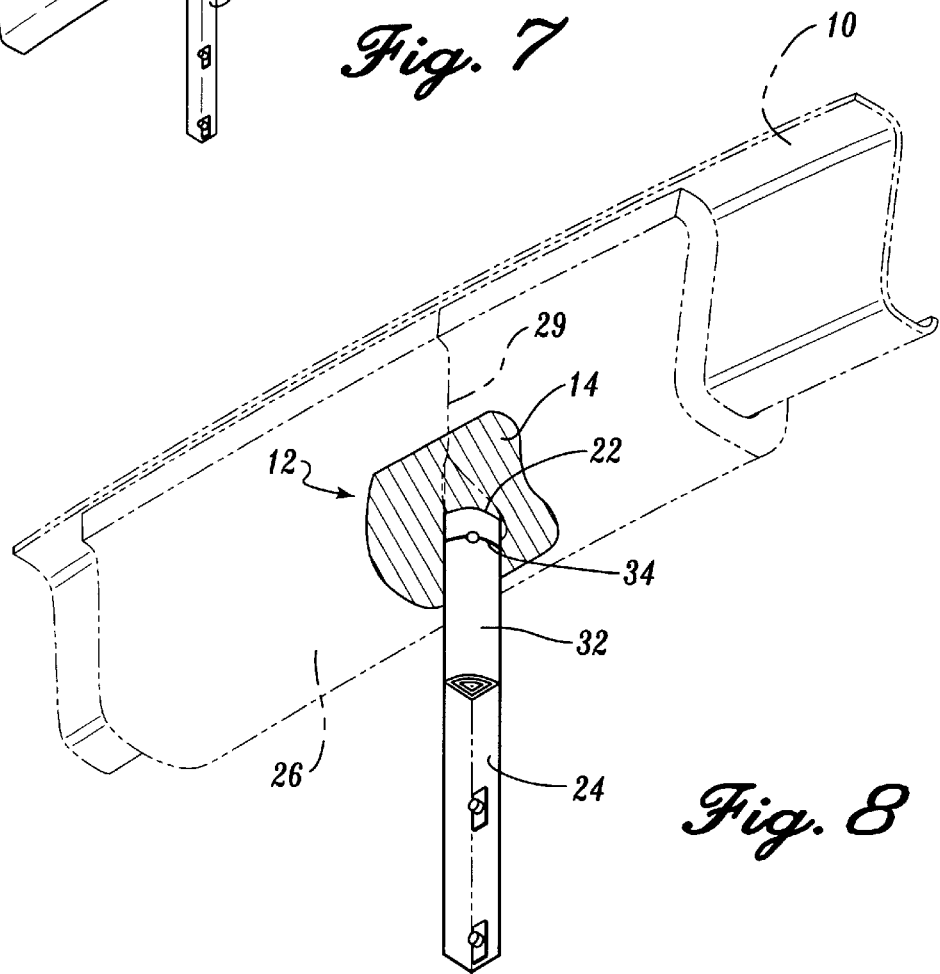
FIG. 8 is a perspective view of a third embodiment of a seal formed in accordance with the present invention for use with the example penetration of FIG. 7.

In FIG. 8, the filler 32 is shown held in place using an encircling tie 34 that is provided for installation purposes. Referring to FIG. 9, the resulting cross-sectional shape of the combined bracket and filler 32 is positive or convex. Referring to FIG. 8, the resulting configuration shows the seal 12 tightly sealing the bracket and the filler 32.

In addition to the above sealing apparatus, a method of sealing the space 28 between an aircraft penetration 24 and surrounding insulation material 26 is provided. The purpose of sealing the space 28 is to prohibit moisture from passing through the space 28. The method includes providing a seal 12 having a patch 14 with first and second face surfaces 16, 18, an opening 22 in the patch 14, and adhesive 20 applied to the first face surface 16. The opening 22 is sized smaller than the cross-sectional area of the penetration 24 to be sealed. The method further includes applying the patch 14 to the penetration by passing the penetration 24 through the opening 22 from the first face side and pressing the first face 16 to the surrounding material 26. In preferred embodiments, the method further includes removing the seal 12 and the insulation material 26 as a single unit and reapplying them at a later time.

As will be appreciated from reading the above, the benefits of the present invention are many. The seal 12 does not absorb moisture and hence will not become saturated. There are no messy chemicals or bonding putty to handle during the manufacturing assembly process. Pre-cut seal details are installed quickly. The elastic patch 14 fits tightly around penetration features and effectively blocks the path of moist cabin air from migrating behind the insulation material thereby reducing the amount of frost build up. The seal further prevents any condensate liquid runoff from entering back into the cabin area. Also, due to the fact that a single cutout size 22 will stretch to fit more than one cross-section of penetration, only a few patch geometries are necessary to cover thousands of penetrations.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A sealing system for use in aircraft, the system comprising:
    (a) a penetration;
    (b) insulating material located about the penetration, the insulating material including an outer surface, the penetration having a predetermined cross-sectional area at the location of the insulating material outer surface; and
    (c) a seal for sealing against the passage of moisture at the location of the insulating material and the penetration, the seal comprising:
        (i) an elastic patch having an opening with an unstretched area of an amount less than the predetermined penetration cross-sectional area; and
        (ii) an adhesive layer applied to one side of the patch; sealing of the penetration being accomplished by inserting the penetration through the patch opening and contacting the patch adhesive layer onto the insulation outer surface; the smaller cross-sectional area of the opening causing the edges of the seal at the opening to form a lip about the penetration.

2. The sealing system according to claim 1, wherein the area of the unstretched elastic patch opening is about 20% to about 90% smaller than the cross-sectional area of the penetration.

3. The sealing system according to claim 1, wherein the elastic patch is of a thickness in the range of about 0.005 inches to about 0.100 inches.

4. The sealing system according to claim 1, wherein the adhesive layer is formed from a rubber-based water resistant pressure sensitive material.

5. The sealing system according to claim 1, wherein the adhesive layer is formed from a material in a group consisting of acrylic and silicone.

6. The sealing system according to claim 1, wherein the opening is shaped from the group consisting of a circle, a rectangle with rounded corners, and a pair of elongated slots with rounded corners.

7. The sealing system according to claim 1, wherein the penetration has a concave surface and the seal further comprises a filler positionable within the concave surface and about which the patch forms the lip during use.

8. The sealing system according to claim 7, wherein the filler is formed from nomex felt.

9. The sealing system according to claim 8, wherein the filler is treated with an antifungal solution.

10. A sealing system for use in aircraft, the system comprising:

(a) a penetration;

(b) insulating material located about the penetration, the insulating material including an outer surface, the penetration having a predetermined cross-sectional area at the location of the insulating material outer surface; and (c) a seal for sealing against the passage of moisture at the location of the insulating material and the penetration, the seal comprising:

(i) an elastic patch having an opening with an unstretched area of an amount less than the predetermined penetration cross-sectional area; the elastic patch being of a thickness in the range of about 0.005 inches to about 0.100 inches; and (ii) an adhesive layer applied to one side of the patch; the adhesive layer being formed from a rubber-based water resistant pressure sensitive material; sealing of the penetration being accomplished by inserting the penetration through the patch opening and pressing the patch adhesive layer onto the insulation outer surface; the smaller cross-sectional area of the opening causing the edges of the seal at the opening to form a lip about the penetration.

11. A method of sealing a space between an aircraft penetration and material surrounding the penetration, the surrounding material having an outer surface, the penetration having a predetermined cross-sectional area at the location of the surrounding material outer surface, the method comprising:

(a) providing a seal for sealing against the passage of moisture at the location of the surrounding material and the penetration; the seal comprising an elastic patch including an opening with an unstretched area of an amount less than the predetermined penetration cross-sectional area and an adhesive layer applied to one side of the patch;

(b) positioning the penetration in the patch opening; and (c) pressing the patch adhesive layer onto the surrounding material outer surface; the smaller cross-sectional area of the opening causing the edges of the seal at the opening to form a lip about the penetration.

12. The method of sealing according to claim 11, wherein the elastic patch is formed from a material in the group consisting of neoprene, silicone, and elastomeric polyurethane.

13. The method of sealing according to claim 11, wherein the elastic patch is provided at a thickness of between about 0.005 inches to 0.100 inches.

14. The method of sealing according to claim 11, wherein the adhesive is formed from a rubber-based water resistant pressure sensitive material.

15. The method of sealing according to claim 11, wherein the area of the opening is about 20% to 90% smaller than the cross-sectional area of the penetration to be sealed.

16. The method of sealing according to claim 11, wherein the penetration has a concave surface and the seal further comprises a filler positionable within the concave surface and about which the seal lip is formed.

17. The method of sealing according to claim 16, wherein the filler is formed from nomex felt treated with an antifungal solution.

* * * * *